April 30, 1940.  W. F. SKINNER  2,199,322
METHOD AND MEANS FOR RECONDITIONING DRY CELL BATTERIES
Filed Dec. 19, 1938  2 Sheets-Sheet 1
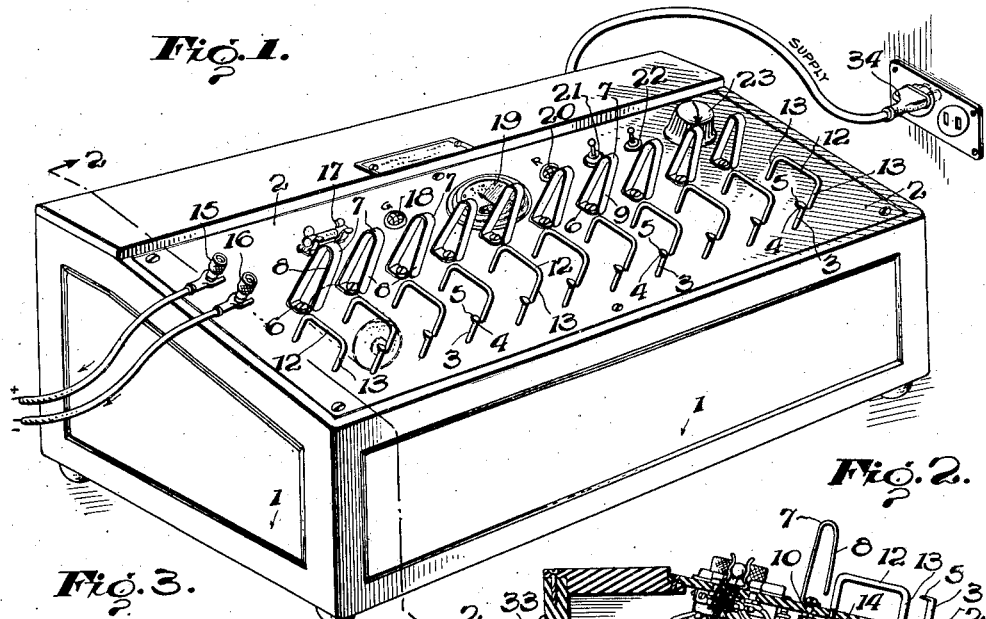
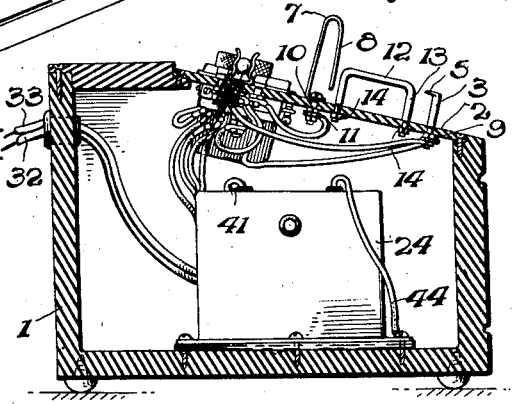
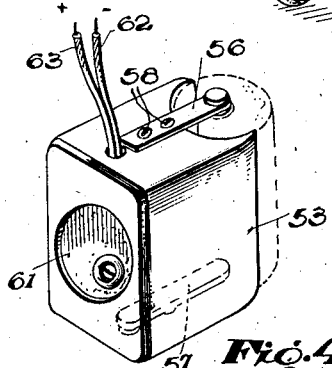
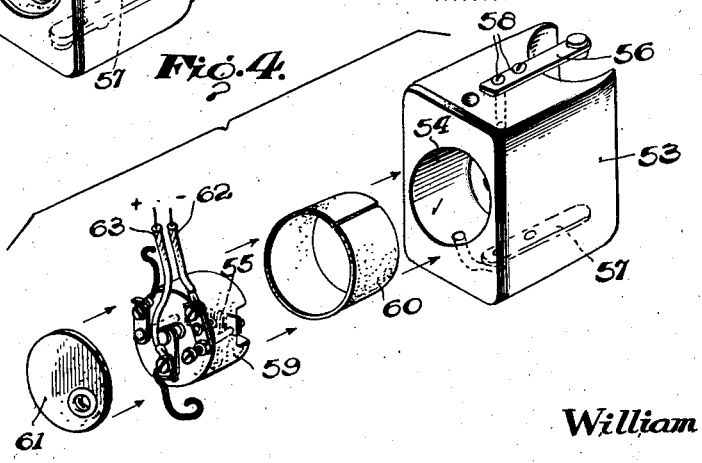
Inventor
William F. Skinner.
By Bernard F. Garvey
Attorney

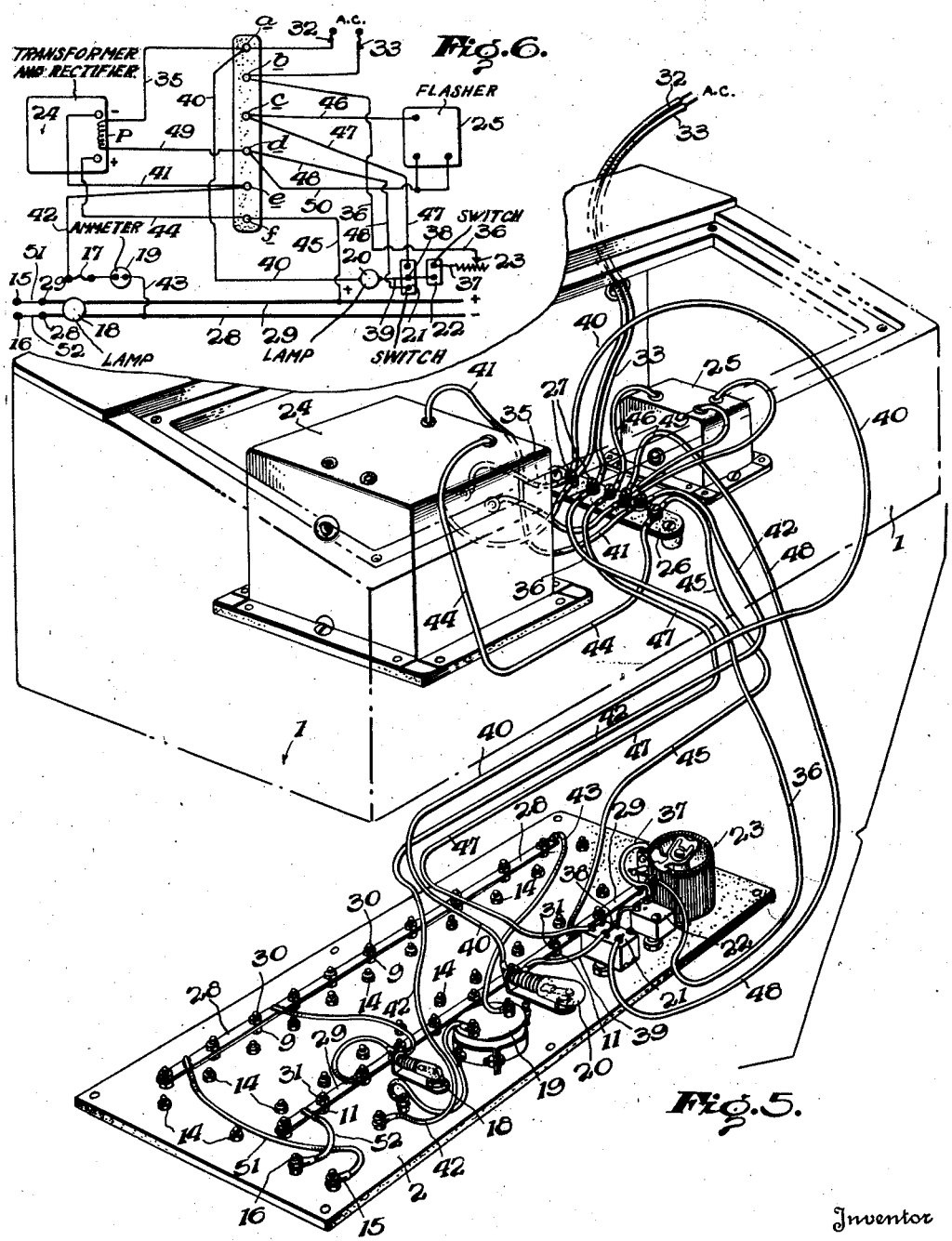

Patented Apr. 30, 1940

2,199,322

UNITED STATES PATENT OFFICE 2,199,322

METHOD AND MEANS FOR RECONDITIONING DRY CELL BATTERIES

William F. Skinner, Miami, Fla., assignor to Skinner Manufacturing Co., Inc., Miami, Fla.

Application December 19, 1938, Serial No. 246,706

8 Claims. (Cl. 171—314)

This invention relates to battery reconditioning or revitalizing and more particularly to a device for revitalizing or reconditioning dry cells of the character used with flash lights, electrical signalling apparatus, ignition circuits, and the like. The present invention is an improvement on the reconditioning arrangement disclosed in my prior application Serial Number 97,818, filed August 25, 1936.

In the above referred to application, there is disclosed a method and apparatus for reconditioning dry cells wherein a cell, for example a cell of the character used with flash lights, is adapted to be reconditioned by connecting the cell to the output circuit of a suitable alternating current rectifier and periodically interrupting the flow of the current through the cell. Means are also disclosed for adjustably mounting the cell in operative reconditioning position on the top or cover portion of the container, within which the electric apparatus is mounted.

After considerable research and experimentation, I have found that an improved commercially practical device, using the basic concept of the dry cell reconditioner of application Serial Number 97,818, can be obtained, the improved dry cell reconditioner being characterized by simplicity of operation, increased efficiency and economy in manufacture.

The device of the present invention comprises essentially a container for the electrical apparatus, which includes a transformer, an alternating current rectifier, and a periodic circuit interrupter, a cover member for the container, upon which a plurality of individual cell holders or brackets, with associated electrical contact members, together with circuit testing and operating devices, are mounted. The electrical circuit of the improved reconditioner comprises briefly, a source of alternating current, a transformer, a rectifier, and a periodic circuit interrupter interposed between the alternating current source and the output circuit of the rectifier. Manually operated switches are also provided for the purpose of opening and closing the various circuits of the system, including circuits to suitable testing devices, comprising pilot lamps, a current indicator, and current control means.

In a typical dry cell, as is well known in the art, the anode is sheet zinc in the form of a cylinder with an open top which acts as the container of the cell, the zinc usually being lined with some non-conducting material such as blotting paper, plaster of Paris or the like. The cathode consists of a carbon rod located axially in the zinc container and a mixture of coke, carbon or other similar materials which surround the rod. A depolarizing agent, in the form of powdered manganese dioxide, is usually mixed with finely ground coke and pressed into the container between the carbon and the non-conducting material which lines the zinc. Ammonium chloride is added, and the cell is then sealed with wax or some other suitable compound.

During normal operation of a cell on discharge, hydrogen is formed and collects on the surface of the carbon electrode. As the layer of hydrogen gas builds up, the internal resistance of the cell is increased with resultant decrease in the output voltage of the cell. It will also be appreciated that in addition to the formation of gas, other chemical reactions are taking place within the cell, between the depolarizing material, electrolyte and the electrodes, when the cell is discharging. Among other reactions, it is known that the zinc reacts with the electrolyte to form a zinc salt and as the available zinc is used up, the zinc container is perforated, allowing the moisture to escape, thus rendering the cell unfit for further use.

Heretofore, it has been suggested to recondition or reactify a dry cell by subjecting the cell to a continuous charge of direct current. It has been proposed, for example, to connect a cell to the terminals of a standard storage battery as a source of direct current or to rectify alternating current and connect the cell to the output side of the rectifying device. In either case, the charge supplied to the cell is a continuous one, and no attempt is made to interrupt the current until the cell is disconnected from the direct current source. It has been found in use of prior art devices of the above mentioned type, that while the cell is apparently reconditioned, it actually becomes depleted in a very short time. In other words, cells subjected to a continuous charge as suggested by the prior art arrangements are not satisfactory for use except for a short period of time after their removal from connection with the direct current source.

I have found that if the direct current to which the cell is subjected is periodically interrupted that the life of the cell is considerably increased and that the reconditioned cell is effective and usable for a long period of time. While, as indicated above, it has been suggested to supply a continuous current for the purpose of reactifying a cell, in accordance with my invention, which is contrary to the teachings of the prior art, the current is periodically interrupted for definite periods of time so that a series of successive direct-current charges are supplied to the cell. By interrupting the flow of current at predetermined intervals many advantages accrue which are not obtainable by using a continuous charge. Among others, the comparatively short charges, with a time interval between successive charges, prevents over-heating, as in the case of a continuous charge, with resultant evaporation of moisture content of the cell. The use of a series of independent charges further permits each preceding charge to slowly diffuse through the electrolyte and other contents of the cell to recondition or reactivate the same for further use.

While no attempt is made to explain the exact mechanism of the reactions which take place within a dry cell, when a periodically interrupted direct current is caused to flow through the cell in reverse direction to the normal flow of current on discharge, I believe that reconditioning is effected by action of the current on the electrolyte, depolarizing agent, and the electrodes of the cell. According to my theory of the operation, the successive short charges slowly permeate the contents of the cell, dissipate gas formation in the vicinity of the cathode and reactify the depolarizing agent. It is also believed that the charges function to replate dissolved zinc on the interior of the container, since it has been found that a continuous charge crystallizes the dissolved zinc, which punctures the separator between the core and the zinc container.

In any event, and regardless of the rationale of the process, dry cells which are reconditioned in accordance with the present invention are characterized by a long active life of substantially the same duration as a new cell, and by means of the present invention, the life of individual cells may be prolonged for a considerable period of time before they have to be discarded.

An object of the invention therefore is to provide an improved process of reconditioning or reactivating dry cells.

A further object of the invention is to provide an improved process for reconditioning dry cells wherein the cells are subjected to a series of successive independent charges of direct current.

Another object of the invention is to provide an improved process for reconditioning dry cells whereby the direct current charge is supplied in a manner adapted to prevent over-heating with resultant evaporation of the moisture content of the cell.

Still another object of the invention is to provide a dry cell reconditioning apparatus, by means of which a plurality of individual cells may be reconditioned.

A still further object of the invention is to provide a dry cell reconditioning apparatus constructed and arranged whereby a successive series of independent direct current charges are supplied to a cell undergoing reconditioning.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a perspective view of the dry cell reconditioning apparatus.

Fig. 2 is a sectional view along line 2—2 of Fig. 1.

Fig. 3 is a perspective view of a modified form of dry cell reconditioning apparatus.

Fig. 4 is an expanded perspective view of the arrangement shown in Fig. 3.

Fig. 5 is a schematic diagram of the electrical circuit used in connection with the dry cell reconditioning apparatus; and Fig. 6 is a perspective view with the cover removed showing the arrangement of the parts and associated electrical circuits.

Referring to the drawings, and more particularly to Figs. 1 and 2, there is shown an improved dry cell reconditioning or revitalizing apparatus comprising a casing or container, designated generally by numeral 1, and a cover member 2, a support for a plurality of dry cell holders, together with pilot lamps, circuit control devices, current control and current indicating apparatus. The container 1 is closed at both ends and at front and back, cover member 2 being adapted to fit into a recessed portion formed by cutting out the front side and top panels, as shown, whereby the cover fits flush with the top edges of these panels and is inclined at an angle to the horizontal.

The dry cell holders each comprise a rigid metallic contact member 3 having a head portion 4 formed with a sharp pointed end 5, adapted for engagement with the base portion of the anode of a dry cell. The other contact member of the holder is formed from sheet metal and is provided with a base 6, the body portion of the member being bent back upon itself as at 7, to provide a resilient contact finger, 8, adapted for engagement with the cathode of the cell. The rigid members 3 may be attached to the cover by means of nuts 9 adapted to thread on the lower end portions thereof and bases 6 of the resilient contacts may similarly be attached to the cover by means of suitable bolts 10 having nuts 11 threaded thereon.

Between each holder or pair of contact members there is mounted a spacer or partition member 12 adapted to maintain the cells in separated position and also to provide lateral support for the individual cells when they are placed in the operative reconditioning position with respect to the holders. The spacers or separators 12 are each formed with leg members 13 having reduced threaded end portions adapted to receive nuts 14 whereby the separators are securely fastened to the cover member. There is also mounted upon the cover or instrument panel 2 two terminals 15 and 16, a circuit protective device in the form of a fuse 17, a pilot light 18, ammeter 19, pilot light 20, switch members 21 and 22, and a current controlling rheostat 23, the purposes and functions of which will be described more fully hereinafter.

Mounted within the container, as shown in Fig. 6, is a suitable alternating current rectifying device designated generally by numeral 24, which may be of any conventional type. The unit used herein includes a transformer and rectifier, not shown, the rectifier being connected to the output circuit of the transformer. Also mounted within the container is a circuit interrupter or flasher 25, adapted to be alternatively placed in circuit with the rectifying device whereby the current supplied to the contact members 3 and 8 of the dry cell holders may be periodically interrupted. A distributing panel 26, having a plurality of terminal or connection parts 27 is attached to the base of the container, between the rectifying device and the flasher.

Attached to the back of cover member 2 and extending lengthwise thereof are two bus-bars 28 and 29, with which the cell holder contact members 3 and 8 respectively are electrically connected. It will be noted by reference to Figs. 2 and 5, that the threaded end portions of contact members 3 extend through the cover and bus-bar 28, the bar being clamped between nuts 9 and 30. Similarly, bolts 10 used to fasten the resilient contact members to the cover, extend through bus-bar 29 with the bar clamped between nuts 11 and 31.

The electrical connections between the source of alternating current, the rectifying unit, flasher, distributing panel, and the apparatus on the cover member or instrument panel may be traced by referring to the wiring diagram in Fig. 6 wherein like numerals are used to designate corresponding leads shown in Fig. 5. Referring to the wiring diagram, suitable leads 32 and 33 are connected to a source of alternating current by means of an attachment plug 34 (Fig. 1), and to terminals a and b on the distributing panel 26. One side of the A. C. line is connected by means of lead 35 to the primary wiring P, of the transformer of the rectifying unit and the other side of the line is connected by lead 36 to one terminal of rheostat 23. The other terminal of the rheostat is connected by a lead 37 to switch 22 across common terminal 38 of switch 21 and lead 39 through lamp 20 and lead 40 back to terminal a. It will thus be seen that when switch 21 is turned to the "on" position, lamp 20 will be illuminated, an indication that the apparatus is in condition for operation after leads 32 and 33 have been plugged in to a suitable source of current.

One side of the rectifying output circuit is connected by means of a lead 41 to terminal post e, lead 42 through fuse 17, ammeter 19 and lead 43 to bus bar 28. The other side of the rectifier output is connected by a lead 44 to terminal f and through lead 45 to bus bar 29. The flasher or periodic circuit interrupter 25 is connected by lead 46 to terminal c, through lead 47 to one side of double throw switch 21 and from switch 21 through lead 48 to terminal d, which is connected by lead 49 and 50 to the primary P of the transformer and flasher respectively.

In the operation of the circuit so far described, it will be seen that when switch 21 is in one position the flasher is cut off and in the other position of the switch the flasher is placed in circuit. For example, when switch 21 is operated to connect lead 47 with the live side of the line, through switch 27 and rheostat 23, the flasher is in circuit and will periodically interrupt the flow of current to the dry cells which are being reconditioned. The purpose of this arrangement is to permit a cell to be subjected to a continuous charge for a short period of time, which is desirable under certain circumstances, and then finish the reconditioning operation by means of a series of independent charges.

In some types of cell, particularly those of large capacity, for example dry cells of the character used for ignition purposes and the like, it has been found that an initial constant charge for a short period of time is beneficial in that it tends to warm up the cell prior to reconditioning by means of separate intermittent charges. In order to accommodate larger cells, terminals 15 and 16 connected to bus bars 28 and 29, by means of leads 51 and 52, are provided. The dry cell which is to be reconditioned may be conveniently connected by means of an extension to terminals 15 and 16, and by suitable manipulation of switch 21, be given a preliminary continuous charge of direct current, followed by a series of successive independent charges to complete the reconditioning process.

In the operation of the device, when it is desired to recondition or reactify a dry cell, or battery of dry cells, the individual cells are first tested to determine whether or not they are in suitable condition to be reactivated. The cells are tested by inserting them in one of the holders, between contact members 3 and 8, and noting the ammeter reading, it being assumed, of course, that switch 22 has first been thrown to the operative position. If the ammeter reading is 5 amps. or more, the cell is available for reconditioning. After testing the cells, those which show a proper amperage are reactified as follows: Any number of cells up to ten are placed in the cell holders with their electrodes in electrical contact with members 3 and 8; switches 21 and 22 are then manipulated to connect the unit with the A. C. source, and place the flasher in circuit with the cells, the ammeter being observed for the purpose of noting the first pulsation, which is also indicated by the flashing of pilot lamp 18. After fifteen pulsations, the cells are completely reactivated.

The ammeter reading should never exceed 9.5–10 amps., however, if the current exceeds 10 amps., it may be cut down by means of the adjustable rheostat 23. The flasher device is designed so that the time interval between successive direct current charges is three seconds, that is, the individual charges are maintained for a period of four seconds and after each charge the circuit is interrupted for a period of three seconds.

Referring to Fig. 3 and Fig. 4 there is shown a modified form of dry cell reconditioning units adapted to be directly connected to a source of direct current, for example, a storage battery. This unit is designed primarily for use with automobiles or other vehicles equipped with a storage battery used in connection with the ignition or lighting circuits of a vehicle. The modified unit comprises a body portion 53, formed from wood or other suitable insulating material, provided with a recessed portion 54 of sufficient diameter to accommodate a circuit interrupter or flasher 55, together with its associated connections to dry cell contact members 56 and 57 which may be attached to the body portion of the unit by screws 58 or other fastening means. One face of the body is cut away to provide a semi-circular shaped seat of substantially the same curvature as the cylindrical body of the dry cell, so that a cell may be securely supported therein between contact members 55 and 56. The flasher unit is mounted upon a porcelain base 59 and insulated from the body of the unit by means of an insulating sleeve 60. A suitable cover 61 is provided for the purpose of inclosing the flasher within the unit and leads 62 and 63, may be employed to connect the unit with a source of current.

It will be understood that the above described unit is designed for attachment to the instrument panel or other suitable location on an automobile and that it is particularly intended for use in those circumstances where it is desired to recondition a single cell or a small number of cells without loss of time or because of emergency use. For example, police cars, trucks, or the like, may be equipped with one or more of the units so that a single cell or several cells may be conveniently reconditioned in the field.

It will be appreciated that the dry cell reconditioning apparatus of the present invention is easy to operate and consists of but comparatively few parts which are not liable to get out of order, even after long and continued use. The container may be provided with any suitable finish, and the arrangement of the testing devices on the instrument board or panel can, of course, be varied as to position or location with respect to each other. Suitable current over-load protective devices, in addition to the main fuse, may also be provided, and if desired, a time controlled switch may be used in connection with the apparatus, whereby the cells may be automatically cut-out of circuit at a predetermined time after reconditioning, so that abnormal or excessive heating is prevented in event the apparatus is left unattended.

While I have shown and described the preferred embodiment of my invention, I wish it to be understood that I do not confine myself to the precise details of construction herein set forth, by way of illustrations as it is apparent that many changes and variations may be made therein, by those skilled in the art, without departing from the spirit of the invention, or exceeding the scope of the appended claims.

I claim:

1. The method of reactivating a dry cell comprising, connecting the cell to a source of direct current so that the current passes through the cell from the positive to the negative pole thereof, repeatedly interrupting the flow of current by disconnecting the cell from the current source for a period of three seconds and then connecting the cell to said current source for a period of four seconds, whereby the cell is subjected to a series of successive independent charges of direct current.

2. The method of reactivating a dry cell comprising, connecting the cell to a source of direct current, passing current through the cell in reverse direction to the normal flow of current from the cell on discharge, repeatedly interrupting the flow of said current every four seconds for a period of three seconds by disconnecting the cell from and connecting it to the direct current source to permit the preceding charge to be uniformly distributed through the cell, whereby the active components of the cell which have diffused in the electrolyte are returned to their original condition without localized heating, by a series of successive independent charges of direct current.

3. The method of reactivating a dry cell comprising, connecting the cell to a source of direct current, so that the current passes through the cell from the positive to the negative pole thereof, repeatedly interrupting the flow of said current for a predetermined period of time less than the time of flow of current before interruption by connecting the cell and disconnecting it from the current source whereby the cell is subjected to a successive series of independent charges of direct current.

4. The method of reactivating a dry cell comprising, connecting the cell to a source of direct current, so that the current passes through the cell in reverse direction to the normal flow of current from the cell on discharge, interrupting the flow of said current by intermittently connecting the cell and disconnecting it from the current source, the period of interruption being of sufficient duration to permit uniform distribution of the preceding independent charges whereby localized heating and vaporization of the moisture content of the cell is prevented.

5. The method of reconditioning a dry cell which has become polarized, comprising connecting the cell to a source of direct current, so that the current passes through the cell in reverse direction to the normal flow of current from the cell on discharge to break down the gas formation in the vicinity of the cathode, interrupting the flow of said current at predetermined periods of time to permit uniform distribution of preceding charges within the cell and prevent vaporization of the moisture content thereof, by disconnecting the cell from the current source and then after each interruption, connecting the cell to the current source for a time interval greater than the period of interruption, whereby the cell is subjected to a successive series of independent charges of direct current.

6. The method of reactivating a dry cell comprising, connecting the cell to a source of direct current so that the current passes through the cell in reverse direction to the normal flow of current from the cell on discharge, maintaining a constant flow of said current for a period of time of sufficient duration to heat the contents of the cell, and then intermittently interrupting the flow of said current by disconnecting the cell from and connecting it to the direct current source, whereby the cell is subjected to a successive series of independent charges of direct current.

7. A dry cell reconditioning apparatus comprising, a housing, a plurality of dry cell holders mounted thereon, each of said holders comprising a pair of contact members, one of said members being adapted for engagement with the anode of a dry cell, and the other of said members adapted for engagement with the cathode of a dry cell, a source of direct current in circuit with said contact members, said source being connected to the contact members so that the flow of current through a dry cell in engagement with the contact members will be in a reverse direction to the normal flow of current from the cell on discharge and time controlled means for intermittently disconnecting one of the contact members from and connecting it to the direct current source for predetermined periods of time, the period of time for which the contact is disconnected from the direct current source being less than the period of time for which said contact is connected to the direct current source.

8. A dry cell reconditioning apparatus comprising, a casing, a cover for said casing, a plurality of dry cell holders mounted thereon, each of said holders comprising a pair of contact members mounted in spaced relation upon the cover, one of said members being rigid and adapted for engagement with the anode of a dry cell, the other of said members having a portion thereof movable with respect to its point of support and adapted for yielding engagement with the cathode of a dry cell, a source of direct current in circuit with said contact members, the positive side of said source being connected to the anode contact member and the negative side thereof being connected to the cathode contact member, whereby the flow of current through a dry cell in engagement with the contact members will be in a reverse direction to the normal flow of current from the cell on discharge and time controlled means for intermittently disconnecting one of said contact members from and connecting it to the direct current source for predetermined periods of time, the period of time for which the contact is disconnected from the direct current source being less than the period of time for which said contact is connected to the direct current source.

WILLIAM F. SKINNER.